(12) United States Patent
Jakob et al.

(10) Patent No.: US 7,491,777 B2
(45) Date of Patent: Feb. 17, 2009

(54) POLYMER DISPERSIONS HAVING IMPROVED WATER-VAPOR BARRIER ACTION, THEIR PRODUCTION AND USE FOR FOOD COATING

(75) Inventors: Martin Jakob, Kelkheim (DE); Heinrich Harrer, Frankfurt am Main (DE)

(73) Assignee: Celanese Emulsions GmbH, Kronberg/TS. (DE)

( * ) Notice: Subject to any disclaimer, the term of this patent is extended or adjusted under 35 U.S.C. 154(b) by 317 days.

(21) Appl. No.: 11/000,406

(22) Filed: Nov. 30, 2004

(65) Prior Publication Data

US 2005/0154123 A1 Jul. 14, 2005

(30) Foreign Application Priority Data

Dec. 2, 2003 (DE) .................................. 103 56 779

(51) Int. Cl.
*C08F 218/08* (2006.01)
*C08F 222/14* (2006.01)
*C09D 131/04* (2006.01)
*A23C 19/16* (2006.01)

(52) U.S. Cl. ...................................... 526/213; 526/456

(58) Field of Classification Search ................. 526/213, 526/458, 456
See application file for complete search history.

(56) References Cited

U.S. PATENT DOCUMENTS

| | | | |
|---|---|---|---|
| 2,232,595 A | 2/1941 | Dittmar et al. | |
| 2,699,396 A | 1/1955 | Francis | |
| 3,298,855 A | 1/1967 | Helin et al. | |
| 4,591,887 A | 5/1986 | Arbree et al. | |
| 5,364,674 A | 11/1994 | Saal et al. | |
| 6,558,719 B1 | 5/2003 | Blumenberg et al. | |
| 6,624,243 B2 * | 9/2003 | Stark et al. ................... | 524/823 |
| 7,078,455 B2 * | 7/2006 | Heldmann et al. ........... | 524/524 |
| 2002/0007009 A1 | 1/2002 | Stark et al. | |
| 2004/0077782 A1 | 4/2004 | Heldmann et al. | |

FOREIGN PATENT DOCUMENTS

| | | |
|---|---|---|
| CH | 0419816 | 8/1966 |
| DE | 1066849 | 12/1960 |
| DE | 1122703 | 1/1962 |
| DE | 1142269 | 1/1963 |
| DE | 1150268 | 6/1963 |
| DE | 2258538 | 6/1973 |
| DE | 2222280 | 11/1973 |
| DE | 35 03 441 | 8/1985 |
| DE | 0266804 | 4/1989 |
| DE | 40 12 953 | 10/1991 |
| DE | 199 57 454 | 5/2001 |
| DE | 101 12 431 | 10/2002 |
| EP | 0167477 | 1/1986 |
| EP | 0986965 | 3/2000 |
| EP | 1 153 979 A2 | 11/2001 |
| EP | 1153979 A2 * | 11/2001 |
| FR | 1358127 | 4/1964 |
| GB | 919375 | 2/1963 |
| GB | 1024607 | 3/1966 |
| GB | 1044610 | 10/1966 |
| JP | 2001/240115 | 9/2001 |
| JP | 2002/240862 | 8/2002 |
| WO | WO-02/074856 A2 | 9/2002 |
| WO | WO 02074856 A2 * | 9/2002 |
| WO | WO-03/054041 | 7/2003 |

OTHER PUBLICATIONS

Derwent Abstract of AN 1989:476745-CAPLUS (Kureha Chemical Industry Co., Ltd., Japan) [JP 01013949—date: Jan. 18, 1989 Appln. No. JP 1987-170734 date: Jul. 8, 1987].
Derwent Abstract of AN 1992:549858-CAPLUS (Snow Brand Milk Products Co., Japan) [JP 04166036 date: Jun. 11, 1992 Appln. No. JP 1990-287143 Date: Oct. 26, 1990].
Derwent Abstract of AN 1997:403040-CAPLUS (Kureha Chemical Industry Co., Ltd., Japan) [JP 09132221 date: May 20, 1997—Appln. No. JP 1995-315986 Nov. 9, 1995].
Derwent Abstract of AN 2001:650440-CAPLUS (Mitsubishi Shoji Plastic Corporation, Japan) [JP 2001/240115 Sep. 4, 2001—Appln. No. JP 2000-48389 Feb. 24 2000] US 2003/124229 Jul. 3, 2003—US 2002-182942 date: Aug. 20, 2002.
Derwent Abstract of AN 2002:649935-CAPLUS (Snow Brand Milk Products Co., Ltd., Japan) [JP 2002/240862 Aug. 28, 2002—Appln. No. JP 2001-39633 Feb. 16, 2001].

* cited by examiner

*Primary Examiner*—Kelechi C Egwim
(74) *Attorney, Agent, or Firm*—Connolly Bove Lodge & Hutz LLP

(57) ABSTRACT

A decsription is given of an aqueous copolymer poly(vinyl ester) dispersion comprising A) 100 parts by weight of a copolymer derived from
 A1) from 34.9 to 95% by weight of vinyl esters of aliphatic, saturated carboxylic acids,
 A2) from 4.9 to 65% by weight of maleic esters and/or fumaric esters of monohydric aliphatic alcohols having a chain length of $C_1$-$C_{18}$ and/or alpha-olefins having from 2 to 8 carbon atoms,
 A3) from 0.1 to 10% of at least one comonomer having at least one stabilizing nonionic or ionic group, and also
 A4) if appropriate, other comonomers,
the sum of components A1, A2 and A3 and if appropriate A4 giving 100% by weight,
B) from 0.1 to 4.5 parts by weight, based on the total amount of the monomers used, preferably from 0.5 to 3.5 parts by weight of at least one protecting colloid, preferably poly(vinyl alcohol),
C) from 0.1 to 10 parts by weight, based on the total amount of the monomers used, preferably from 0.5 to 5.0 parts by weight, of a nonionic emulsifier, and
D) if appropriate, further additives suitable for coating foods.

The dispersion is produced by free-radical emulsion polymerization and is suitable for coating foods. The films formed from these dispersions are distinguished by a low water-vapor transmission rate.

21 Claims, No Drawings

POLYMER DISPERSIONS HAVING IMPROVED WATER-VAPOR BARRIER ACTION, THEIR PRODUCTION AND USE FOR FOOD COATING

The present invention relates to improved polymer dispersions based on copolymer poly(vinyl esters) for coating foods, which polymer dispersions are distinguished by an improved water-vapor barrier action.

The use of polymer dispersions, in particular based on homopolymer or copolymer poly(vinyl esters), such as poly (vinyl acetate), has long been known, for coating foods, in particular hard cheese and meat products. In the case of hard cheese coating, the dispersions are used as aid for controlled cheese ripening. The surface treatment and subsequent drying on of the dispersion generates a gas-permeable water-vapor barrier film which prevents not only mold formation on the cheese, but also excessively rapid drying out of the cheese loaf during ripening. During the ripening process, the cheeses pass through storage in moist rooms lasting for a plurality of weeks to months. The unwanted growth of microorganisms is counteracted by an antimicrobial finish of the dispersions with special biocides, such as described in EP-A-0 986 965, for example. Customarily, the films of the dispersions used for cheese ripening have, under standard climatic conditions (23° C., 50% atmospheric humidity) water-vapor transmission rates of >150 g/(m²·d) at a film thickness of 300 µm. This still relatively high water-vapor permeability ensures that the cheese can develop, in a controlled manner in moist rooms, rind formation, consistency and flavor, by a water loss controlled in time, but without drying out too rapidly.

A disadvantage of such commercially conventional dispersions based on homopolymer, or in particular copolymer, poly(vinyl acetate), is, however, that these products, because of their still too-high water-vapor permeability are suitable only to a limited extent for coating other foods, for example meat products, stem vegetables or fruits. These foods are finished, in part relatively long storage-life end products, which are not to alter their weight and consistency by water loss. These products are therefore frequently offered on the market in gas- and water vapor-tight sealed film overwraps (also as heat-shrink film, as described, for example, in JP-A 2002/240862) or in blister packs. For reasons of simplified application (for example in the form of a sprayed application or immersion application), it would be advantageous also to be able to coat these products with dispersions. At the same time, in the same process step, by simple addition of biocides or UV absorbers to the dispersion, biological and chemical stabilization of the products could be achieved.

On the market, there is currently a lack of universally usable products based on homopolymer or copolymer poly (vinyl esters), in particular based on homopolymer or copolymer poly(vinyl acetate), having reduced water-vapor permeability which at the same time, compared with the conventional coating materials, are suitable not only as aids for cheese ripening, but also as packaging material for other foods.

EP-A 0 167 477 describes a packaging for foods, in particular for vegetables, fruit, cheese, meat products or sausage products, in the form of a directly applied film made of a mixed polymer. The mixed polymers preferably suitable comprise those made of vinyl acetate/vinyl laurate and of vinyl acetate/maleic esters. The application can also be performed from an emulsion. The mixed polymer layer forms an air-tight, oxygen-tight and water vapor-tight package. However, a complete gas barrier for the sought-after product is not desirable for the reasons mentioned above.

U.S. Pat. No. 3,298,855 describes a packaging material for foods based on a paper layer coated, inter alia, with blends of polyethylene and vinyl acetate/dibutyl fumarate latices. The water-vapor transmission rates achieved of 16 to 31 g/(m²·d) of the total composite are already in a favorable range, but this coated paper is only suitable for an outer wrapping and not for direct application. In addition, the blends used for the coating in dispersion form, owing to material incompatibilities, are not storage stable.

DE-A 40 12 953 describes a plastic film which is suitable as a tubular sausage casing and has a reinforcement made of a two-dimensional fibrous material which at least on one of both of its surfaces has an impregnation and if appropriate a coating made of a plastic, which essentially consists of a mixed polymer having at least two different monomer units which are selected from the group consisting of vinyl esters, maleic esters, fumaric esters, acrylic esters, methacrylic esters, linear alpha-olefins having from 2 to 8 carbon atoms and styrene. These dispersions also are not applied directly to the food. In addition, these composites also have high water-vapor transmission rates.

CH-419 816 describes a process for preserving foods by applying an aqueous emulsion comprising as main constituent a copolymer which forms an elastic film which remains supple as far as a temperature of about 0° C. and which film makes possible the exhalation of gases and water, but completely prevents penetration of the outer atmosphere inwards, as a result of which the bacteria and mold formation, and also weight losses, are substantially to completely prevented. Suitable aqueous emulsions comprise copolymers of various monomers, for example of two or more of vinyl acetate, ethylene and maleic esters. The technical description of the publication implies, however, that the prevention of the weight losses in the case of hard cheese during storage is only achieved by application of a plastic shrink film over the dispersion coating.

DE-B 1 142 269 describes the use of polymer dispersions and/or polymer solutions, in particular of mixed polymers of vinylidene chloride, which, at room temperature, but at most 30° C., form a film, the flexibility of which is retained to at least +10° C. and which has low water-vapor and/or gas permeability, for application to the surfaces of foods, in particular cheese, sausage and ham, in amounts up to 5 mg/cm² of plastic dry matter. The water-vapor transmission rates are 3-15 g/(m²·d). The foods treated according to this invention exhibit markedly decreased losses. In the disclosure of DE-B 1 142 269, mixed polymers of vinylidene chloride are described. Further details of the chemical composition of the mixed polymers are not disclosed.

DE-A 101 12 431 describes an aqueous plastic dispersion which is likewise claimed for a food coating and is based on a heterogeneously-composed vinyl ester copolymer P made of two homopolymers or copolymers A and B that is essentially stabilized by ionic components, the homopolymers or copolymers A and B independently of one another comprising in copolymerized form (a) from 50 to 100% by weight of at least one vinyl ester of carboxylic acids having from 1 to 18 carbon atoms and (b) from 0 to 25% by weight of at least one monoethylenically unsaturated halogen-substituted or unsubstituted hydrocarbon having from 2 to 4 carbon atoms, based on the total mass of the monomers used for the preparation of the respective homopolymer or copolymer A and B, which dispersion, based on the total mass of the monomers used for the preparation of the vinyl ester copolymer P, contains from 0 to 10% by weight of at least one ethylenically unsaturated ionic monomer and from 0 to 15% of ionic emulsifiers, with the total mass of ethylenically unsaturated ionic monomers and ionic emulsifiers being at least 2% by weight. This solution batch has a low content of hydrophilic protecting colloid, which already means a low water-vapor transmission is expected, but owing to the multiple ionic stabilization with ionic comonomer and/or ionic emulsifier, leads to disadvantageously low viscosities under solids contents close to those in practice of about 50% by weight, which are not desired for some uses as food coating.

WO-A-03/054041 relates to a food coating composition comprising a plasticizer-free aqueous copolymer poly(vinyl ester) dispersion which comprises 100 parts by weight of a copolymer composed of from 40 to 95% by weight of vinyl esters of aliphatic saturated carboxylic acids, from 5 to 60% by weight of maleic esters and/or fumaric esters of monohydric aliphatic alcohols having a chain length of $C_1$-$C_{18}$, with or without other comonomers, B) from 0.1 to 1.0 parts by weight of an emulsifier, C) from 1 to 12 parts by weight of a mixture of at least two polyvinyl alcohols consisting of at least 0.1 part by weight of at least one polyvinyl alcohol of a degree of hydrolysis of from 85 to 90 mol % and also at least 0.1 part by weight of at least one poly(vinyl alcohol) of a degree of hydrolysis of greater than 90 mol %, preferably from 90.5 to 94 mol %, and D) with or without other stabilizers.

Products prepared according to WO-A-03/054041, however, do not have the desired low water-vapor transmission. Experiments to improve this property failed, since at reduced proportions of the polyvinyl alcohols used for the stabilization, the required colloidal stability is lost.

The object which therefore underlay the invention was to provide polymer dispersions, the films formed from which are distinguished from those of the conventional coating compositions by a decreased water-vapor permeability with water-vapor transmission rates of <150 g/(m²·d), preferably <120 g/(m²·d), in particular <100 g/(m²·d) and which not only are thus suitable as packaging material for foods, but also can be used as coatings for the ripening of foods, for example of sausage products or cheese.

Surprisingly, it has now been found that this object is achieved by copolymer poly(vinyl ester) dispersions comprising selected monomers in selected amounts which are prepared by means of selected amounts of a mixed stabilizing system which comprises at least one protecting colloid, preferably poly(vinyl alcohol), and at least one nonionic emulsifier. A further part of the stabilizing system is a copolymerizable stabilizing composition.

The present invention thus relates to an aqueous copolymer poly(vinyl ester) dispersion comprising
A) 100 parts by weight of a copolymer derived from
A1) from 34.9 to 95% by weight of vinyl esters of aliphatic, saturated carboxylic acids, preferably fatty acids having a chain length of $C_1$-$C_{18}$, in particular vinyl acetate,
A2) from 4.9 to 65% by weight of maleic esters and/or fumaric esters of monohydric aliphatic alcohols having a chain length of $C_1$-$C_{18}$, in particular dialkyl maleate and/or dialkyl fumarate, and/or alpha-olefins having from 2 to 8 carbon atoms, in particular ethylene, very particularly preferably dibutyl maleate and/or dibutyl fumarate,
A3) from 0.1 to 10% of at least one comonomer having at least one stabilizing nonionic or ionic group, and also
A4) if appropriate, other comonomers,
the sum of components A1, A2 and A3 and if appropriate A4 giving 100% by weight, B) from 0.1 to 4.5 parts by weight, based on the total amount of the monomers used, preferably from 0.5 to 3.5 parts by weight of at least one protecting colloid, preferably poly(vinyl alcohol),
C) from 0.1 to 10 parts by weight, based on the total amount of the monomers used, preferably from 0.5 to 5.0 parts by weight, of a nonionic emulsifier, and
D) if appropriate, further additives suitable for coating foods.

The inventive aqueous copolymer poly(vinyl ester) dispersion is distinguished by low water-vapor transmission rates of films formed from it.

Preferably, the water-vapor transmission rates of films formed from it is <150 g/(m²·d), particularly preferably <120 g/(m²·d), and in particular <100 g/(m²·d) (d=24 hours).

The vinyl esters A1 of aliphatic saturated carboxylic acids of chain length $C_1$-$C_{18}$, are, for example vinyl formate, vinyl acetate, vinyl propionate, vinyl butyrate, vinyl isobutyrate, vinyl pivalate, vinyl 2-ethylhexanoate, vinyl esters of alpha-branched carboxylic acids having from 9 to 11 carbon atoms in the acid radical (® Versatic acids), the vinyl esters of lauric, palmitic, myristic and stearic acid. The content of these vinyl esters in the copolymer is at least 34.9% by weight, preferably at least 40% by weight, very particularly preferably from 40 to 65% by weight.

The use of the vinyl esters of aliphatic fatty acids is preferred, among them, in particular, vinyl acetate. The vinyl esters A1 can also be present in the poly(vinyl ester) in combination of two or more thereof together with one another.

The maleic esters and fumaric esters A2 of monohydric aliphatic alcohols of chain length $C_1$-$C_{18}$ are those of saturated alcohols of chain length $C_1$-$C_{18}$ or those with monohydric aliphatic unsaturated alcohols of chain length $C_3$-$C_{18}$, but preferably those with saturated alcohols of chain length $C_4$-$C_8$, in particular dibutyl maleate or di-2-ethylhexyl maleate and/or fumarate.

The content of these monomers A2, if appropriate in combination with other comonomers from this group, is from 4.9 to 65% by weight, preferably from 10 to 60% by weight, very particularly preferably from 20 to 55% by weight.

The alpha-olefins having from 2 to 8 carbon atoms A2 are branched or straight-chain alpha-olefins, for example prop-1-ene, but-1-ene, pent-1-ene, hex-1-ene, hept-1-ene, oct-1-ene and, in particular, ethylene.

Comonomers A2 which are preferably used are maleic and/or fumaric esters or ethylene.

The use of dibutyl maleate and/or dibutyl fumarate is particularly preferred.

The comonomers A2 can also be present in the poly(vinyl ester) together with one another in combination of two or more thereof.

Suitable comonomers of the group A3 have at least one stabilizing nonionic or ionic group, preferably an acid group, in the molecule which additionally stabilize the emulsion polymer via polymer-bound functional groups and/or charges.

The amount of the stabilizing comonomers A3, if appropriate in combination with further comonomers of this monomer group, is from 0.1 to 10% by weight, preferably from 0.5 to 8% by weight, of the total copolymer composition A).

The comonomers A3 can also be present together with one another in the poly(vinyl ester) in combination of two or more thereof.

Among stabilizing nonionic groups, in the context of this description, these are taken to mean groups which are derived from polyalkylene glycols or are the amide groups and/or hydroxyalkyl groups. These are, in particular, ester groups with polyalkylene glycols, ester groups with amino alcohols, ester groups with dihydric or polyhydric alcohols in which only one alcohol group is esterified, and also amide groups including lactams.

Stabilizing ionic groups, in the context of this description, are taken to mean groups which are present in the inventive aqueous dispersion in the form of ionized radicals and which, in dilute aqueous solution at pH 2 and/or 11, are present as ionic compound at more than 50%, preferably more than 80%.

Suitable comonomers A3 having stabilizing nonionic groups are, in particular, esters of ethylenically unsaturated aliphatic monocarboxylic and/or dicarboxylic acids with polyalkylene glycols, preferably with polyethylene glycols and/or polypropylene glycols, or esters of ethylenically unsaturated carboxylic acids with amino alcohols, such as (meth)acrylic esters of amino alcohols, for example of diethylaminoethanol, and/or (meth)acrylic esters with dimethylaminoethanol, and also (meth)acrylic esters with dihydric aliphatic alcohols of chain length $C_2$-$C_{18}$, in which only one alcohol group is esterified. In addition, suitable compounds are amides of ethylenically unsaturated carboxylic acids, such as amides of acrylic and methacrylic acid and N-methylolamides of acrylic and methacrylic acid and also ethers thereof. A further group of these monomers is N-vinylamides, including N-vinyllactams, for example vinylpyrrolidone or N-vinyl-N-methylacetamide.

Suitable comonomers A3 having stabilizing ionic groups are ethylenically unsaturated carboxylic acids or sulfonic acids which have one or two carboxyl groups or one sulfonic acid group. Instead of the free acids, their salts can also be used, preferably alkali metal salts or ammonium salts. Examples of these are acrylic acid, methacrylic acid, crotonic acid, maleic acid, fumaric acid, itaconic acid, vinylsulfonic acid, sytrenesulfonic acid, half esters of maleic or fumaric acid and itaconic acid with monohydric aliphatic saturated alcohols of chain length $C_1$-$C_{18}$ and also the alkali metal and ammonium salts thereof or (meth)acrylic esters of sulfoalkanols, for example sodium 2-sulfoethyl methacrylate.

Particularly suitable are half esters of maleic or fumaric acid and of itaconic acid with monohydric aliphatic saturated alcohols of chain length $C_1$-$C_{18}$ and also their alkali metal and ammonium salts. These include the acids or salts of mono-n-methyl maleate or fumarate, mono-n-ethyl maleate or fumarate, mono-n-propyl maleate or fumarate, mono-n-butyl maleate or fumarate, monoisobutyl maleate or fumarate, mono-n-pentyl maleate or fumarate, mono-n-hexyl maleate or fumarate, monocyclohexyl maleate or fumarate, mono-n-heptyl maleate or fumarate, mono-n-octyl maleate or fumarate, mono-(2-ethylhexyl) maleate or fumarate, mono-n-nonyl maleate or fumarate, mono-n-decyl maleate or fumarate, mono-n-undecyl maleate or fumarate, monolauryl maleate or fumarate, monomyristyl maleate or fumarate, monopalmitoyl maleate or fumarate, monostearyl maleate or fumarate, and their analogs of itaconic acid.

For further comonomers A4, which can be used in the copolymer, any desired comonomers can be used which do not belong to groups A1, A2 or A3. Examples of these are esters of aliphatic carboxylic acids of chain length $C_3$-$C_{12}$ with unsaturated alcohols of chain length $C_3$-$C_{18}$, the acrylic and methacrylic esters of monohydric aliphatic saturated alcohols, vinyl chloride, vinylidene chloride, acrylonitrile and methacrylonitrile, butadiene, isoprene, $C_9$-$C_{16}$ alpha-olefins, 2-chlorobutadiene, 2,3-dichlorobutadiene, tetrafluoroethylene, styrene, vinyl ethers of monohydric aliphatic saturated alcohols of chain length $C_1$-$C_{18}$, divinyl and diallyl esters of saturated and unsaturated aliphatic dicarboxylic acids of chain length $C_3$-$C_{18}$, vinyl and allyl esters of acrylic acid and crotonic acid and triallyl cyanurate. Preference as further comonomers A4 is given to acrylic esters of monohydric aliphatic saturated alcohols of chain length $C_4$-$C_8$ or $C_{14}$-$C_{16}$ alpha-olefins or butadiene.

The amount of the monomer group A4, if appropriate in combination with other comonomers from this monomer group, is typically from 0 to 15% by weight, preferably from 0 to 10% by weight.

Preferably, however, in addition to the three abovementioned monomer groups A1 to A3, no further comonomers are used.

As protecting colloid B), that is to say as polymeric stabilizer, suitable compounds are methylcelluloses, hydroxyethylcelluloses and propyl-celluloses and also sodium carboxymethylcellulose, gelatin, casein, starch, gum arabic, hydroxyethyl starch, sodium alginate, and also homopolymers or copolymers containing monomer units derived from the monomers A1 to A3, preferably A1 and/or A3, for example vinyl esters, (meth)acrylic acids and/or (meth)acrylic esters and also N-vinylamides, including the N-vinyllactams and/or the water-soluble salts of these homopolymers or copolymers. Examples of (meth)acrylic acids are polyacrylic acid and/or polymethacrylic acid. Examples of N-vinylamides are polyvinylpyrrolidone and N-vinylacetamide.

The preferred protecting colloid is poly(vinyl alcohol). Suitable poly(vinyl alcohol) has degrees of hydrolysis of from 60 to 100 mol % and viscosities of the 4% strength aqueous solutions at 20° C. of 2-70 mPa·s, in particular from 30 to 70 mPa·s.

Preferably, use is made of at least one relatively high molecular weight poly(vinyl alcohol) of degree of hydrolysis of 85-92 mol % having a viscosity of the 4% strength aqueous solutions at 20° C. of from 30 to 70 mPa·s.

Said protecting colloids can obviously also be used in the form of mixtures.

Particularly preferably, poly(vinyl alcohol) is used as protecting colloid, use being made predominantly of the above described relatively high molecular weight poly(vinyl alcohol) which if appropriate has small amounts of other protecting colloids, for example up to 10% by weight, based on the total amount of the protecting colloid used.

The relatively high molecular weight poly(vinyl alcohol) preferably used is preferably present in the protecting colloid at at least 60% by weight, based on the total amount of the protecting colloid used, very particularly preferably at from 75 to 100% by weight.

The amount of the protecting colloids used, based on the copolymer A), is from 0.1 to 4.5 parts by weight, preferably from 0.25 to 4.0 parts by weight, in particular from 0.5 to 3.5 parts by weight, and very particularly preferably from 0.5 to 2.95 parts by weight.

Suitable nonionic emulsifiers C) are, in particular, acyl-, alkyl-, oleyl- and alkylarylethoxylates. These products are obtainable, for example on the market under the name Genapol® or Lutensol®. This covers, for example, ethoxylated mono-, di- and trialkylphenols (EO degree: 3 to 50, alkyl substituent radical: $C_4$ to $C_{12}$) and also ethoxylated fatty alcohols (EO degree: 3 to 80; alkyl radical: $C_8$ to $C_{36}$), especially $C_{12}$-$C_{14}$-fatty alcohol (3-8) ethoxylates, $C_{13}$-$C_{15}$-oxo alcohol (3-30) ethoxylates, $C_{16}$-$C_{18}$-fatty alcohol (11-80) ethoxylates, $C_{10}$-oxo alcohol (3-11) ethoxylates, $C_{13}$-oxo alcohol (3-20) ethoxylates, polyoxyethylenesorbitan monooleate having 20 ethylene oxide groups, copolymers of ethylene oxide and propylene oxide having a minimum content of 10% by weight of ethylene oxide, the polyethylene oxide (4-20) ethers of oleyl alcohol and also the polyethene oxide (4-20)

ethers of nonyl phenol. Particularly suitable are the polyethylene oxide (4-20) ethers of fatty alcohols, in particular of oleyl alcohol. Of nonionic emulsifiers, use is made of from 0.1 to 10 parts by weight, preferably from 0.5 to 5.0%, based on the copolymer A). Use may also be made of mixtures of nonionic emulsifiers.

For further improvement of stability it is also possible to make use in conjunction of further, in this case ionic, preferably anionic, stabilizers as coemulsifier. Examples which may be mentioned are sodium, potassium and ammonium salts of straight-chain aliphatic carboxylic acids of chain length $C_{12}$-$C_{20}$, sodium hydroxyoctadecanesulfonate, sodium, potassium and ammonium salts of hydroxy fatty acids of chain length $C_{12}$-$C_{20}$ and their sulfation and/or acetylation products, alkyl sulfates, also as triethanolamine salts, alkyl($C_{10}$-$C_{20}$) sulfonates, alkyl($C_{10}$-$C_{20}$) arylsulfonates, dimethyldialkyl($C_8$-$C_{18}$)ammonium chloride, and sulfation products thereof, alkali metal salts of sulfosuccinic esters with aliphatic saturated monohydric alcohols of chain length $C_4$-$C_{16}$, sulfo-4-succinic esters with polyethylene glycol ethers of monohydric aliphatic alcohols of chain length $C_{10}$-$C_{12}$ (disodium salt), sulfo-4-succinic esters with polyethylene glycol nonylphenyl ether (disodium salt), sulfosuccinic acid bis-cyclohexyl ester (sodium salt), lignosulfonic acid and calcium, magnesium, sodium and ammonium salts thereof, resin acids, hydrogenated and dehydrogenated resin acids and alkali metal salts thereof, dodecylated diphenyl ether disulfonic acid sodium and also sodium lauryl sulfate or ethoxylated sodium lauryl ether sulfate (EO degree 3).

Use may also be made of mixtures of ionic emulsifiers.

Any additional ionic emulsifiers present are used in a deficit with respect to the nonionic emulsifiers. Typically, the content of ionic emulsifiers, based on the total amount of the emulsifiers used, is up to 40% by weight, preferably less than 10% by weight.

Particularly preferably, in addition to nonionic emulsifiers, no further ionic emulsifiers are used.

The inventive aqueous copolymer poly(vinyl ester) dispersions, after their preparation, typically have a viscosity of at least 1.5 Pa·s (measured at 20° C. using a Brookfield RVT viscometer), preferably of at least 2 Pa·s, in particular from 3 to 20 Pa·s. These viscosities may be reduced or increased in a manner known per se as required by final processing, in order to set the composition to the desired application form.

The solids content of the inventive aqueous copolymer poly(vinyl ester) dispersions is from 20 to 70% by weight, preferably from 30 to 65% by weight, and particularly preferably from 40 to 60% by weight.

The minimum film-forming temperature of the inventive dispersions is typically below 25° C., preferably below 15° C. The film-forming temperature can be modified and set specifically by adding coalescence agents which are known per se.

The inventive aqueous copolymer poly(vinyl ester) dispersions lead advantageously to an application property profile which is novel to date. At the same time, the dispersions have the required colloidal stability and rheology.

The inventive aqueous copolymer poly(vinyl ester) dispersions, in addition to an excellent storage stability, are distinguished by a viscosity which is very expedient for the application, so that by simple measures films may be produced therefrom which themselves have a water-vapor transmission rate which is reduced in comparison with previously known solutions.

This property profile is principally determined by selection of the monomer combination of the copolymer A) comprising small amounts of units derived from ionic comonomers A3, the relatively low content of protecting colloid B) and the presence of the nonionic emulsifier C).

The films formed from the inventive aqueous copolymer poly(vinyl ester) dispersions are distinguished in the use as coating composition of foods compared with the conventional coating compositions in addition to a viscosity expedient for the application by a decreased water-vapor permeability with water-vapor transmission rates of <150 g/(m²·d), preferably <120 g/(m²·d), in particular <100 g/(m²·d), frequently also markedly below. In addition, the important requirements of film glossiness and wax adhesion which are necessary for the application as cheese coating composition are completely met.

Thus the inventive dispersions are suitable not only as improved aid for the ripening of foods, such as cheese ripening, but also as coating and packaging material for foods.

The invention further relates to a process for producing the inventive dispersions by means of free-radical emulsion copolymerization.

The invention therefore also relates to a process for producing aqueous copolymer poly(vinyl ester) dispersions comprising the free-radical emulsion polymerization of i) from 34.9 to 95% by weight of vinyl esters of aliphatic saturated carboxylic acids (A1), ii) from 4.9 to 65% by weight of maleic esters and/or fumaric esters of monohydric aliphatic alcohols having a chain length of $C_1$-$C_{18}$ and/or alpha-olefins having from 2 to 8 carbon atoms (A2), iii) from 0.1 to 10% of at least one comonomer having at least one stabilizing nonionic or ionic group (A3), and also iv) if appropriate, other comonomers (A4), the total of the components A1, A2 and A3 and if appropriate A4 giving 100% by weight, in the presence of v) from 0.1 to 4.5 parts by weight, based on the total amount of the monomers used, of at least one protecting colloid, and vi) from 0.1 to 10 parts by weight, based on the total amount of the monomers used, of nonionic emulsifier.

This polymerization can be carried out in the batch process, in the feed-stream process, or combined batch/feed-stream process or in continuous loop reactors or stirred-tank cascades.

Preferably, however, the combined batch/feed-stream process is employed, or particularly preferably the feed-stream process, customarily a portion of the monomers (from 1 to 15% by weight) being initially charged to start the polymerization. The monomers can be metered either together or in separate feed streams. In addition, it can be advantageous, in certain embodiments, to carry out a seed polymerization to set specific particle sizes and particle distributions.

Free-radical initiators used are, for example: hydrogen peroxide, benzoyl peroxide, cyclohexanone peroxide, isopropylcumyl hydroperoxide, persulfates of potassium, sodium and ammonium, peroxides of even-numbered saturated monobasic aliphatic carboxylic acids of chain length $C_8$-$C_{12}$, tertiary butyl hydroperoxide, ditertiarybutyl peroxide, diisopropyl percarbonate, azoisobutyric acid dinitrile, acetylcyclohexanesulfonyl peroxide, tertiarybutyl perbenzoate, tertiarybutyl peroctoate, bis-(3,5,5,-trimethyl)hexanoyl peroxide, tertiarybutyl perpivalate, hydroperoxypinane, p-methane hydroperoxide. Said compounds can also be used within a redox system, with transition metal salts such as iron(II) salts or other reducing agents being used in conjunction. As reducing agents or regulators, use can be made in conjunction of alkali metal salts of oxymethanesulfinic acid, mercaptans of chain length $C_{10}$-$C_{14}$, but-(1)-en-3-ol, hydroxylamine salts, sodium dialkyldithiocarbamate, sodium bisulfite, ammonium bisulfite, sodium dithionite, diisopropylxanthogen disulfide, ascorbic acid, tartaric acid, isoascorbic acid, boric acid, urea and formic acid.

Preferably, however, water-soluble persulfates, in particular ammonium persulfate or sodium persulfate, are used to start the polymerization.

The comonomers A3) which are used for stabilization during the polymerization and have at least one stabilizing nonionic or ionic group (and/or if appropriate other comonomers) are either charged completely at the start of the polymerization, or charged in part and in part metered, or added completely during the polymerization. In certain embodiments it is possible to perform this addition either in a linear manner or in specially adapted metering profiles, for example in the form of a gradient procedure.

By this means, functional groups can be specifically enriched on particle surfaces, which in most cases means further stabilization of the dispersions.

The protecting colloid or the protecting colloids used for the stabilization, preferably the poly(vinyl alcohol) B), can likewise either be charged completely at the start of the polymerization, charged at the start in part and metered in part, or added completely during the polymerization, however, in a preferred embodiment, component B) being charged at the start completely.

The nonionic emulsifier or nonionic emulsifiers C) used in conjunction for stabilization can likewise either be charged completely at the start of the polymerization, or charged at the start in part and metered in part, or added completely during the polymerization. In a preferred embodiment, this component is charged at the start in part and metered in part. The same applies in principle to the conjoint use of one or more further ionic coemulsifiers.

The pH of the dispersion is typically between 2 and 7, preferably between 2.5 and 6.

The polymerization temperature ranges typically from 20 to 120° C., preferably from 30 to 110° C., and very particularly preferably from 45 to 95° C.

After completion of the polymerization, for monomer removal, a further, preferably chemical, aftertreatment can follow, in particular with redox catalysts, for example combinations of the abovementioned oxidizing agents and reducing agents. Furthermore, in a known manner, for example by physical monomer removal, that is to say removal by distillation (in particular via steam distillation) or by stripping using an inert gas, residual monomer present can be removed. Particularly efficient is a combination of physical and chemical methods which permits a lowering of the residual monomers to very low contents (<1000 ppm, preferably <100 ppm).

The inventive dispersion can, after its production, be finally processed using additives D). These cover, for example, compounds which are suitable as thickeners. Primarily, again, here poly(vinyl alcohol) and cellulose ether may be mentioned which, in addition to the compounds used as protecting colloid after termination of the polymerization, or preferably after monomer removal, are added to set a suitable application viscosity. Type and amount of these additives must be chosen so that the formed films produced from the finally processed composition have the desired low water-vapor transmission rates.

Suitable further additives or stabilizers for producing the dispersion are methylcelluloses, hydroxyethylcelluloses and propylcelluloses, and also sodium carboxymethylcellulose. These can be used in conjunction, in principle, to adapt specific properties such as glossiness and water-vapor transmission permeability and for stability improvement. This group of compounds covers gelatin, casein, starch, gum arabic, hydroxyethyl starch, sodium alginate, lactose, silicon dioxide and homopolymers or copolymers of the polymers used for producing the copolymer A), or their water-soluble salts, for example polyacrylic acid and polyvinylpyrrolidone.

Finally, further additives D) can be added to the dispersion. This group covers, for example, said stabilizers. Suitable additives are, obviously, also low-molecular weight stabilizers such as neutralizing agents and complexing agents. Examples which may be mentioned are alkali metal, ammonium and calcium hydroxides, carbonates and phosphates, alkali metal salts of ethylenediaminetetraacetic acid and N-hydroxyethylethylene-diaminetriacetic acid, citric acid, and also sodium acetate and phosphoric acid, ammonium chloride, sodium sulfate, homopolymer of 2-acrylamido-2-methylpropanesulfonic acid and sodium, potassium and ammonium salts thereof, and biocides, that is to say substances for protecting the dispersion and/or the packaged substrate against microbial infection. However, other desired polymer dispersions, in particular poly(vinyl ester) dispersions, can be added, provided that the water-vapor transmission rate of the film produced does not fall below the desired value. Preferably, use is made of preservatives which are permitted in the relevant law on food regulations for additives for cheese or the other foods to be coated.

If the dispersion is finally processed to give a composition for coating foods, use can be made of colorants permitted in the relevant positive lists such as carotene (E 160a), annatto (E 160b), Carbo Medicinalis vegetabilis (E 153), titanium dioxide (E 171), tartrazine (E 102), quinoline yellow (E 104), sunset yellow FCF (E 110), cochineal red A (E 124), indigotine (E 132), brilliant black BN (E 151), or lithol rubine BK (E 180).

A particularly preferred selection of the raw materials used for producing the dispersion and for final processing conforms to the directives of the Netherlands Warenwet [Product Law] B.1.4 and/or recommendation XVI part B of the BgVV [German Federal Institute for Risk Assessment].

The inventive aqueous copolymer poly(vinyl ester) dispersions are suitable, owing to the reduced water-vapor transmission rate and the expedient viscosity values, not only as aids for cheese ripening, but also as coating compositions and/or as packaging materials for foods of all types, in particular for meat and sausage products, for vegetables, in particular stem vegetables, for fruits, preferably hard-shelled fruits, in particular citrus fruits, for seed material and for cheese. Furthermore, they are suitable for producing coatings as aids in the production of foods, in particular cheese.

These uses are likewise subject matter of the present invention. The examples hereinafter serve to illustrate the invention. The parts and percentages stated in the examples relate to weight, unless stated otherwise.

Production of Dispersions for Inventive Food-Coating Compositions

EXAMPLE 1

In a cylindrical glass stirred-tank reactor equipped with heating/cooling bath, anchor stirrer, metering apparatuses and reflux condenser, 2 parts of PVA BP-26 (partially saponified poly(vinyl alcohol) from Chang-Chun Petrochemical Co., Ltd., with a degree of hydrolysis of 86-89 mol % and a mean viscosity of 50-58 mPa·s, measured in 4% strength aqueous solution at 20° C.) and 1.0 parts of ®Genapol O-200

(ethoxylated oleyl alcohol from Clariant GmbH having a mean degree of ethoxylation of 20 mol ethylene oxide) were suspended together with 0.1 parts of anhydrous sodium acetate in 65.5 parts of deionized water and then dissolved at a temperature of at least 80° C. This solution was cooled overnight to room temperature. Before polymerization, 0.1 part of glacial acetic acid was added and the experimental batch was heated. At 65° C., 10 parts of in total 100 parts of monomer mixture were added to the bath. This mixture consisted of 5.75 parts of vinyl acetate and 2.125 parts each of di-n-butyl maleate and mono-2-ethylhexyl maleate. The reaction was started by adding 0.18 part of ammonium peroxodisulfate in 1.8 parts of deionized water. After the initiation of polymerization (approximately 15 minutes) the residual monomer mixture, consisting of 49.25 parts of vinyl acetate, 38.625 parts of dibutyl maleate and 2.125 parts of mono-2-ethylhexyl maleate were added in the course of 4 hours. At the same time, a solution of 0.05 part of ammonium peroxodisulfate, 1 part of Genapol O-200 and 0.18 part of sodium bicarbonate in 20 parts of water were added in parallel. The reaction temperature was held during this time at from 70 to 72° C. After the end of the feeds, 0.05 part of ammonium peroxodisulfate in 1 part of water were added and then polymerization was further continued for 1 hour up to approximately 90° C. To reduce the residual monomers, in the cooling phase polymerization was continued by additions of 0.01 part of a commercially conventional 70% strength solution of tert-butyl hydroperoxide (at 80° C.) and 0.075 part of ascorbic acid (at 75° C.) each in 1.7 parts of water. To set a pH in the range of 4-5, a further 1.5 parts of 10% strength sodium hydroxide solution were added to the finished dispersion at room temperature. This produced coagulum-free dispersions having the test results listed in table 1.

EXAMPLE 2

Example 2 was prepared in a similar manner to example 1, with the difference that the added monomer mixture consisted of 54.25 parts of vinyl acetate, 33.625 parts of dibutyl maleate and 2.125 parts of mono-2-ethylhexyl maleate.

EXAMPLE 3

Example 3 was prepared in a similar manner to example 1, with the difference that, in the aqueous initial charge, instead of 1 part of Genapol O-200, 2 parts of Genapol O-200 were used, and the monomer mixture consisted of 52.25 parts of vinyl acetate, 33.625 parts of dibutyl maleate and 4.125 parts of mono-2-ethylhexyl maleate and instead of 1 part of Genapol O-200, likewise 2 parts of Genapol O-200 were used in the metering.

EXAMPLE 4

Example 4 was prepared in a similar manner to example 1, with the difference that, in the aqueous initial charge, instead of 1 part of Genapol O-200, 2 parts of Genapol O-200 were used, and with an identical monomer mixture, instead of 1 part of Genapol O-200, likewise 2 parts of Genapol O-200 were used in the metering.

EXAMPLE 5

Example 5 was prepared in a similar manner to example 1, with the difference that, in the initial charge, instead of 2 parts of PVA BP-26, only 1.5 parts of PVA BP 26 were used, and also instead of 1 part of Genapol O-200, 1 part of Genapol O-120 was used and the added monomer mixture consisted of 39.25 parts of vinyl acetate, 48.625 parts of dibutyl maleate and 2.125 parts of mono-2-ethylhexyl maleate and that, instead of 1 part of Genapol O-200, 1 part of Genapol O-120 was used in the metering.

EXAMPLE 6

Example 6 was prepared in a similar manner to example 1, with the difference that, in the aqueous initial charge, instead of 2 parts of PVA BP-26, only 1.5 parts of PVA BP 26 were used, and also instead of 1 part of Genapol O-200, 1 part of Genapol O-120 was used, and the added monomer mixture consisted of 44.25 parts of vinyl acetate, 43.625 parts of dibutyl maleate and 2.125 parts of mono-2-ethylhexyl maleate and that, instead of 1 part of Genapol O-200, 1 part of Genapol O-120 was used in the metering.

COMPARATIVE EXAMPLE C1

The comparative example C1 relates to the use of Mowilith™ SDM 4230 KL, a commercially conventional dispersion from Celanese Emulsions GmbH for food coating, in particular for cheese coating, which is based on vinyl acetate/ maleate and is stabilized with poly(vinyl alcohol).

Application-Oriented Testing as Coating Composition for Cheese

Application-Oriented Study Methods Used for Evaluation as Food-Coating Composition Measurement of Film Glossiness The film glossiness was measured using a Dr. Lange laboratory reflectometer RL 3 from Dr. Bruno Lange GmbH. The samples under test were drawn out on a glass plate with a wet-film thickness of 300 µm using a box scraper from Erichsen and then dried for 24 hours at room temperature. The laboratory reflectometer is first calibrated using calibration standard A (polished high-gloss black glass plate). The measuring head of the reflectometer is placed on the surface of the sample under test and the measurement started. The reflectometer measures successively at different angles of incidence. The measurement is carried out in triplicate at three different locations on the surface under test and the arithmetic mean is calculated. The results of the measurements were evaluated at 20° angle of incidence, and their mean scale divisions are reported.

Wax Adhesion Test

The films are prepared by pouring 80 g of a dispersion diluted to 14% solids via a gauze onto a metal plate equipped with a rim having a surface area of 314 cm². In this manner a dried polymer film of 300 µm layer thickness is produced. From this film a round film piece is cut out of diameter 60 mm and conditioned for a period of 48 h at a temperature of 23° C. at 50% relative humidity. The resultant film piece is used to seal a glass cylinder which is equipped with a metal flange and into which 0.5 g of water has been weighed out in advance. Thereafter the film upper surface is coated with completely molten yellow wax (®Paradip Yellow B1 from Paramelt B. V.) (80° C.) 4 mm thick. After a standing time of 5 h at 23° C. and 50% relative humidity, the composite polymer film/wax is taken off from the glass cylinder and separated by pulling apart manually. The adhesion is evaluated according to resistance to separation:

(+)=Good adhesion with relatively strong deformation of the polymer film on separation.

(+/−)=Moderately good adhesion with moderately strong deformation of the polymer film on separation.
(−)=Relatively poor adhesion with only slightly occurring deformation of the polymer film on separation.

Measurement of the Water-Vapor Transmission Rate

To measure the water-vapor transmission rate, film pieces are first prepared in a similar manner to the procedure in the wax adhesion test, and climatically conditioned.

The two film pieces are each clamped into a vessel into the glass dish of which in advance exactly 10 g of deionized water have been weighed out. The vessel is a high metal cylinder having a wall thickness of 4 mm, a height of 20 mm and an internal diameter of 55 mm having a detachable integrated glass dish. On this glass dish, the round film piece of diameter about 60 mm is placed between two rubber seals. To prevent water vapor escaping between the two seal rings during the experiment, in addition a metal ring is screwed onto the top of the metal cylinder with six screws. A film surface area of 23 cm$^2$ remains through which water can evaporate. After careful screwing, the vessel containing the film is placed on an analytical balance. The weight determination is repeated after 7 days. During this time the samples are stored at 23° C. and 50% relative humidity.

The water-vapor transmission rate is calculated as follows:

Calculation: water loss=1st weighing−reweighing (all values reported in g)

Calculation of diffusion:

$$\frac{\text{water loss}}{\text{surface area} \times \text{number of days}} = \frac{\text{water loss} \times 10^4}{23 \times 7} \left[\frac{g}{m^2 \cdot d}\right]$$

The values thus determined relate to the film thickness used of 300 µm.

The experiments carried out and the results of the application-orientated tests are summarized in table 1.

These results make clear that, compared with a customary commercially conventional dispersion for coating foods, in particular hard cheese, by the inventive material selection, a markedly reduced water-vapor transmission rate can be established, without the important parameters for this field of application such as film gloss and wax adhesion being adversely affected. Here, on the contrary, a comparable or improved property profile is even achieved. The inventive examples, furthermore, have a favorable application viscosity and thus comply with the partial requirement of a suitability as cheese-coating composition.

The invention is further described by the example hereinafter with reference to the coating of commercially conventional cucumbers. The results obtained with respect to weight loss over a certain period occur to the same extent, or in the same quality, as also for coatings of meat and sausage products, for vegetables, for fruits, preferably hard-shelled fruits, in particular citrus fruits and for seed material etc having the inventive aqueous copolymer poly(vinyl ester) dispersions. The invention is therefore not limited to this specific example.

Coating Composition

The dispersions of the inventive examples 1 and 2 and also of the comparative example C2 (Mowilith® LDM 1481, copolymer vinyl acetate/ethylene dispersion, commercial product of Celanese Emulsions GmbH, D-65926 Frankfurt/Main) were each set to a solids content of 50% by weight using water. Viscosities of 0.4-5 Pa·s (20° C., Brookfield RVT, Sp. 1 or Sp. 3) were obtained. The coating compositions contained no other preservatives.

Coating of Cucumbers

Fresh commercially conventional cucumbers cleaned by short rinsing with water on the surface (length approximately 25 cm, diameter approximately 5 cm) were completely immersed for 5 sec in the respective coating composition and dried for 30 minutes in air under otherwise identical conditions. The cucumbers thus coated and a reference uncoated cucumber were then stored for 21 days at 23° C. and 50%

TABLE 1

| | Example | | | | | | Comp. Ex. C1 |
|---|---|---|---|---|---|---|---|
| | 1 | 2 | 3 | 4 | 5 | 6 | |
| Vinyl acetate % | 55 | 60 | 58 | 55 | 45 | 50 | |
| Dibutyl maleate % | 40.75 | 35.75 | 35.75 | 40.75 | 50.75 | 45.75 | |
| Mono-2-ethylhexyl maleate % | 4.25 | 4.25 | 6.25 | 4.25 | 4.25 | 4.25 | |
| PVOH 56-88% | 2 | 2 | 2 | 2 | 1.5 | ⅓ | |
| Genapol O-120% | — | — | — | — | 2 | 2 | |
| Genapol O-200% | 2 | 2 | 4 | 4 | — | — | |
| pH | 4.7 | 4.7 | 4.6 | 4.6 | 4.6 | 4.6 | 4.5 |
| Solids content % | 51.9 | 51.9 | 51.3 | 51.6 | 51.6 | 51.8 | 45 |
| Residual vinyl acetate % | 0.29 | 0.31 | 0.4 | 0.41 | 0.45 | 0.33 | — |
| Brookfield viscosity RVT spindle 6/20 23° C. mPa · s | 8200 | 10900 | 6400 | 7200 | 7200 | 6100 | 15000 |
| Water-vapor transmission n, 7d g/(m$^2$ · d) | 69.9 | 70.7 | 72.1 | 73.1 | 63 | 54.4 | 175 |
| Film glossiness scale division 20° angle | 136 | 131 | 130 | 134 | 135 | 118 | 95 |
| Glass temperature ° C. | 16.7 | 17.4 | 16.5 | 13.8 | 10.9 | 14.9 | 18 |
| Wax adhesion | + | + | + | + | +/− | + | + | relative humidity. The loss in weight was determined during storage at certain intervals. The results listed in the tables are percentages and are the means of two individual determinations.

TABLE 2

Weight losses for coated cucumbers in percent

|  | 0 day | 2 days | 7 days | 14 days | 21 days |
|---|---|---|---|---|---|
| Reference | 0 | 7 | 17 | 27 | 35 |
| Example 1 | 0 | 0 | 5 | 17 | 25 |
| Example 2 | 0 | 0 | 4 | 10 | 16 |
| Comparative Example C2 | 0 | 2 | 6 | 13 | 22 |

TABLE 3

State of the coated cucumbers after 21 days

|  | State | pH[1] | Appearance of the surface | Coating detachment behavior |
|---|---|---|---|---|
| Reference | heavily dried at the upper end, unappetizing appearance | 4.1 | — | — |
| Example 1 | lightly dried over entire length, virtually fresh appearance | 6.2 | flexible, transparent, glossy | detaches in one piece over entire length |
| Example 2 | lightly dried over entire length, virtually fresh appearance | 6.3 | flexible, transparent, glossy | detaches in one piece over entire length |
| Comparative Example C2 | dried over entire length, appearance still acceptable | 6.3 | flexible, transparent, glossy | detaches over entire length with shred formation |

[1]pH was determined after cutting the cucumbers in the center by means of a standard glass electrode.

This series of experiments shows that the inventive aqueous copolymer poly(vinyl ester) dispersions markedly lower the weight loss compared with a non-surface-treated food by 28 or 54% and are thus suitable as coating material and packaging material. Compared with a known dispersion of the prior art such as LDM 1481, which is suitable in principle for coating foods, likewise comparable or markedly lower weight losses, an improved optical fresh impression of the coated substrates and a simultaneously improved detachability are achieved.

The invention claimed is:

1. An aqueous copolymer poly(vinyl ester) dispersion comprising
   A) 100 parts by weight of a copolymer derived from
      A1) from 34.9 to 65% by weight of vinyl esters of aliphatic, saturated carboxylic acids,
      A2) from about 35 to 65% by weight of maleic esters and/or fumaric esters of monohydric aliphatic alcohols having a chain length of $C_1$-$C_{18}$ and/or alpha-olefins having from 2 to 8 carbon atoms,
      A3) from 0.1 to 10% of at least one comonomer having at least one stabilizing nonionic or ionic group, and also
      A4) optionally other comonomers,
   the sum of components A1), A2), and A3), and optionally A4) giving 100% by weight, based on the total weight of the copolymer, wherein
   B) from 0.1 to 4.5 parts by weight, based on the total amount of the monomers used, of at least one protecting colloid,
   C) from 0.1 to 10 parts by weight, based on the total amount of the monomers used, of a nonionic emulsifier, and
   D) optionally further additives suitable for coating foods.

2. The aqueous copolymer poly dispersion as claimed in claim 1, wherein component A1) is selected from the group consisting of vinyl esters of a fatty acid having a chain length of $C_1$-$C_{18}$ and mixtures thereof.

3. The aqueous copolymer poly dispersion as claimed in claim 1, wherein component A2) is selected from the group consisting of dialkyl maleate, dialkyl fimiarate, mixtures of dialkyl maleate and dialkyl fumarate, and ethylene.

4. The aqueous copolymer poly(vinyl ester) dispersion as claimed in claim 1, wherein component A3) is selected from the group consisting of esters of ethylenically unsaturated aliphatic monocarhoxylic acids with polyalkylene glycols, esters of ethylenically unsaturated aliphatic dicarboxylic acids with polyalkylene glycols, esters of ethylenically unsaturated carboxylic acids with amino alcohols, (meth)acrylic esters with dihydric aliphatic alcohols of chain length $C_2$-$C_{18}$ in which only one alcohol group is esterified, amides of ethylenically unsaturated carboxylic acids, (meth)acrylic esters of sulfoalkanols, N-vinylamides including N-vinyllactams, ethylenically unsaturated carboxylic acids which have one carboxyl group and salts thereof, ethylenically unsaturated carboxylic acids which have two carboxyl groups and salts thereof, ethylenically unsaturated sulfonic acids which have one sulfonic acid group and salts thereof, ethylenically unsaturated sulfonic acids which have two sulfonic acid groups and salts thereof, and mixtures thereof.

5. The aqueous copolymer poly(vinyl ester) dispersion as claimed in claim 4, wherein component A3) is selected from the group consisting of half esters of maleic acid with monohydric aliphatic saturated alcohols of chain length $C_1$-$C_{18}$ and alkali metal and ammonium salts thereof, half esters of fumaric acid with monohydric aliphatic saturated alcohols of chain length $C_1$-$C_{18}$ and alkali metal and ammonium salts thereof, half esters of itaconic acid with monohydric aliphatic saturated alcohols of chain length $C_1$-$C_{18}$ and alkali metal and ammonium salts thereot and mixtures thereof.

6. The aqueous copolymer poly(vinyl ester) dispersion as claimed in claim 1, wherein copolymer A) has repeating structural units derived only from the monomer groups A1 to A3.

7. The aqueous copolymer poly(vinyl ester) dispersion as claimed in claim 1, wherein wherein said protecting colloid B) is poly(vinyl alcohol).

8. The aqueous copolymer poly(vinyl ester) dispersion as claimed in claim 7, wherein the poly(vinyl alcohol) comprises at least one relatively high molecular weight poly(vinyl alcohol) of degree of hydrolysis of 85-92 mol% having a viscosity of the 4% strength aqueous solutions at 20° C. of from 30 to 70 mPa·s.

9. The aqueous copolymer poly(vinyl ester) dispersion as claimed in claim 8, wherein the relatively high molecular weight poly(vinyl alcohol) is present in the protecting colloid at from 75 to 100% by weight based on the total amount of protecting colloid used.

10. The aqueous copolymer poly(vinyl ester) dispersion as claimed in claim 1, wherein wherein said nonionic emulsifiers C) are acyl-, alkyl-, oleyl- and/or alkylarylethoxylates.

11. The aqueous copolymer poly(vinyl ester) dispersion as claimed in claim 1, wherein said aqueous copolymer poly (vinyl ester) dispersion further comprises ionic emulsifiers, wherein the amount of said ionic emulsifiers present, based on the total amount of the ionic and nonionic emulsifiers, is less than 10% by weight, based on the total amount of protecting colloid.

12. The aqueous copolymer poly(vinyl ester) dispersion as claimed in claim 11, wherein, in addition to nonionic emulsifiers, said aqueous copolymer poly(vinyl ester) dispersion does further comprise ionic emulsifiers.

13. The aqueous copolymer poly(vinyl ester) dispersion as claimed in claim 1, wherein its viscosity is at least 1.5 Pa·s (measured at 20° using an RTV Brookfield viscometer).

14. The aqueous copolymer poly(vinyl ester) dispersion as claimed in claim 1, wherein films formed from it have a water-vapor transmission rate of less than 150 g/(m$^2$·d).

15. The aqueous copolymer poly(vinyl ester) dispersion as claimed in claim 1, wherein wherein said aqueous copolymer poly(vinyl ester) dispersion further comprises at least one biocide.

16. A coating composition and/or packaging material for foods which comprises the aqueous copolymer poly(vinyl ester) dispersions as claimed in claim 1.

17. The coating composition and/or packaging material as claimed in claim 16, wherein the foods are meat and sausage products, vegetables, fruits or cheese.

18. The aqueous copolymer poly(vinyl ester) dispersion as claimed in claim 2, wherein component A2) is selected from the group consisting of dibutyl maleate, dibutyl fumarate, and mixtures thereof.

19. The aqueous copolymer poly(vinyl ester) dispersion as claimed in claim 18, is selected from the group consisting of half esters of maleic acid with monohydric aliphatic saturated alcohols of chain length $C_1$-$C_{18}$ and alkali metal and animonium salts thereof, half esters of fumaric acid with monohydric alipharic saturated alcohols of chain length $C_1$-$C_{18}$ and alkali metal and ammonium salts thereof, half esters of itaconic acid with monohydric aliphatic saturated alcohols of chain length $C_1$-$C_{18}$ and alkali metal and ammonium salts thereof, and mixtures thereof.

20. The aqueous copolymer poly(vinyl ester) dispersion as claimed in claim 1, wherein its viscosity is from 3 to 20 Pa·s (measured at 20° using an RTV Brookfield viscometer).

21. The aqueous copolymer poly(vinyl ester) dispersion as claimed in claim 20, wherein films formed from it have a water-vapor transmission rate of less than 100 g/(m$^2$·d).

* * * * *